United States Patent
Endo et al.

(10) Patent No.: US 8,316,014 B2
(45) Date of Patent: Nov. 20, 2012

(54) RECORDING MEDIUM STORING INFORMATION ATTACHMENT PROGRAM, INFORMATION ATTACHMENT APPARATUS, AND INFORMATION ATTACHMENT METHOD

(75) Inventors: Susumu Endo, Kawasaki (JP); Takayuki Baba, Kawasaki (JP); Shuichi Shiitani, Kawasaki (JP); Yusuke Uehara, Kawasaki (JP); Shigemi Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 236 days.

(21) Appl. No.: 12/009,102

(22) Filed: Jan. 16, 2008

(65) Prior Publication Data

US 2008/0177730 A1 Jul. 24, 2008

(30) Foreign Application Priority Data

Jan. 22, 2007 (JP) ................. 2007-012030

(51) Int. Cl.
G06F 7/00 (2006.01)
G06F 17/30 (2006.01)
(52) U.S. Cl. .................. 707/722; 707/723; 707/725
(58) Field of Classification Search .................. 707/721, 707/722, 723, 725
See application file for complete search history.

(56) References Cited

U.S. PATENT DOCUMENTS

| | | | |
|---|---|---|---|
| 6,247,009 B1 * | 6/2001 | Shiiyama et al. ............ | 1/1 |
| 7,321,899 B2 * | 1/2008 | Saito et al. ............ | 1/1 |
| 7,613,690 B2 * | 11/2009 | Chowdhury et al. ............ | 1/1 |
| 7,668,721 B2 * | 2/2010 | Barkley et al. ............ | 704/275 |
| 2006/0036589 A1 * | 2/2006 | Okuda et al. ............ | 707/3 |
| 2007/0011012 A1 * | 1/2007 | Yurick et al. ............ | 704/277 |
| 2008/0071542 A1 * | 3/2008 | Yu ............ | 704/270 |

FOREIGN PATENT DOCUMENTS

| | | |
|---|---|---|
| JP | 07-021202 | 1/1995 |
| JP | 2004-362451 | 12/2004 |
| JP | A 2005-117659 | 4/2005 |

OTHER PUBLICATIONS

C. H. Ngai, P. W. Chan, Edward Yau, Michael R. Lyu, XVIP: An XML-Based Video Information Processing System, Proceedings of the 26th International Computer Software and Applications Conference on Prolonging Software Life: Development and Redevelopment, p. 173-178, Aug. 26-19, 2002.*

(Continued)

*Primary Examiner* — Vincent Boccio
(74) *Attorney, Agent, or Firm* — Greer, Burns & Crain, Ltd.

(57) ABSTRACT

A computer readable recording medium stores an information attachment program for attaching meta-information to multimedia data executed by a computer. The program causes the computer to perform an acquisition step of acquiring a search word of a text search done at a search site; a monitoring step of monitoring whether or not a search frequency of the search word acquired in the acquisition step satisfies a predetermined criterion; a determination step of determining whether or not at least a portion of the search word matches a character recognition processing result of the multimedia data when the search frequency of the search word is determined to satisfy the predetermined criterion in the monitoring step; and a registration step of registering the search word as meta-information of the multimedia data when, as a determination result of the determination step, the search word matches the character recognition processing result.

14 Claims, 7 Drawing Sheets

OTHER PUBLICATIONS

Howard D. Wactlar, Alexander G. Hauptmann, Michael G. Christel, Ricky A. Houghton, Andreas M. Olligschlaeger, Complementary video and audio analysis for broadcast news archives, Communications of the ACM, v.43 n.2, p. 42-47, Feb. 2000.*

A. G. Hauptmann and et al. Informedia at TRECVID 2003: Analyzing and searching broadcast news video. In Proc. of TRECVID 2003, Gaithersburg, MD, 2003.*

W. Qi, L. Gu, H. Jiang, X.-R. Chen, and H.-J. Zhang, "Integrating visual, audio and text analysis for news video," in Proc. Int. Conf. Image Process., vol. 3, 2000, pp. 520-523.*

Notification of Reasons for Refusal issued by the JPO, dated Dec. 6, 2011.

Ariki et al.; "Automatic classification of TV News Articles based on Telop Character Recognition"; pp. 9-18; Faculty of Science and Technology, Ryukoku University; Jul. 30, 1998.

* cited by examiner

| WORD | AVERAGE SEARCH FREQUENCY (COUNT/HOUR) | | | |
|---|---|---|---|---|
| | 1 MONTH AGO | 2 MONTHS AGO | 3 MONTHS AGO | ..... |
| AAA | 257 | 260 | 180 | |
| BBB | 55 | 80 | 40 | |
| CCC | 3 | 5 | 5 | |
| ... | | | | |

| WORD | AVERAGE SEARCH FREQUENCY (COUNT/HOUR) | | | |
|---|---|---|---|---|
| | 0 TO 4 HOURS AGO | 4 TO 8 HOURS AGO | 8 TO 12 HOURS AGO | ..... |
| AAA | 224 | 197 | 274 | |
| BBB | 457 | 349 | 74 | |
| CCC | 7 | 1 | 4 | |
| ... | | | | |

| FRAME START NO. | FRAME END NO. | POSITION | CHARACTER | | CERTAINTY FACTOR |
|---|---|---|---|---|---|
| 1 | 90 | (50,200) | 低 | tei | 0.86 |
| 1 | 90 | (55,200) | 気 | ki | 0.95 |
| 1 | 90 | (60,200) | 圧 | atsu | 0.90 |
| 1 | 90 | (65,200) | 仁 | ni | 0.65 |
| 1 | 90 | (70,200) | よ | yo | 0.80 |
| ⋮ | | | | | |

FIG. 6

| START TIME | END TIME | CHARACTER | | CERTAINTY FACTOR |
|---|---|---|---|---|
| 0.0 | 0.3 | て | te | 0.85 |
| 0.3 | 0.6 | ひ | hi | 0.65 |
| 0.6 | 0.9 | き | ki | 0.85 |
| 0.9 | 1.2 | あ | a | 0.90 |
| 1.2 | 1.5 | つ | tsu | 0.82 |
| ⋮ | | | | |

FIG. 7

| PROGRAM NAME | GENRE | PRIMARY KEYWORD | SECONDARY KEYWORD |
|---|---|---|---|
| ○○ WEATHER FORECAST | METEOROLOGY | ANTICYCLONE, CYCLONE, FIRST SNOW, ... | CHILL, STEEP WAVE, ... |
| ×× NEWS | NEWS | COLLUSIVE BIDDING AT THE INITIATIVE OF GOVERNMENT AGENCIES, ORDINARY DIET SESSION, ... | QUATER, IP TELEPHONE, ... |
| ... | | | |

FIG. 9-A

低気圧による大荒れの天気
"tei" "ki" "atsu" "ni" "yo" "ru" "o" "a" "re" "no" "ten" "ki"

ていきあつによるおおあれのてんき
"te" "i" "ki" "a" "tsu" "ni" "yo" "ru" "o" "o" "a" "re" "no" "te" "n" "ki"

RECORDING MEDIUM STORING INFORMATION ATTACHMENT PROGRAM, INFORMATION ATTACHMENT APPARATUS, AND INFORMATION ATTACHMENT METHOD

TECHNICAL FIELD

The present invention relates to the field of attaching meta-information for management to multimedia data. Particularly, the present invention relates to the field of automatically attaching meta-information reflecting users' interest to multimedia data.

SUMMARY

According to an aspect of an embodiment, a computer readable recording medium stores an information attachment program for attaching meta-information for management to multimedia data executed by a computer. The program causes the computer to execute an acquisition step of acquiring a search word of a text search done at a search site; a monitoring step of monitoring whether or not a search frequency of the search word acquired in the acquisition step satisfies a predetermined criterion; a determination step of determining whether or not at least a portion of the search word matches a character recognition processing result of the multimedia data when the search frequency of the search word is determined to satisfy the predetermined criterion in the monitoring step; and a registration step of registering the search word as meta-information of the multimedia data when, as a determination result of the determination step, the search word matches the character recognition processing result.

BRIEF DESCRIPTION OF THE DRAWINGS

FIG. 2 is a diagram exemplifying a search frequency table according to an embodiment of the present invention;

FIG. 5 is a diagram exemplifying an image recognition result according to an embodiment of the present invention;

FIG. 6 is a diagram exemplifying a speech recognition result according to an embodiment of the present invention;

FIG. 7 is a diagram exemplifying a meta-information database according to an embodiment of the present invention.

FIGS. 9A through 9D are diagrams of characters that are analyzed by the present invention.

DETAILED DESCRIPTION OF THE EMBODIMENT

In recent years, with performance improvement of personal computers and widespread use of DVD (Digital Versatile Disk) recorders and HDD (Hard Disk Drive) recorders for recording TV programs, individuals can now easily handle videos. On Internet sites, for example, many video files videotaped or taken by individuals are exchanged.

As it becomes increasingly easier to handle videos, extraction of desired videos from a vast amount of videos has also been eagerly desired. For this purpose, whether a video is a desired video or not is generally determined by attaching meta-information for management such as keywords for each video and then searching for meta-information associated with each video.

However, attachment of meta-information to videos described above is manually performed and thus, there is a problem of required time and efforts. That is, since it is necessary to select characters and places that match videos as keywords and to manually register them by associating them with videos, both time and costs will increase as the numbered of videos increases.

Furthermore, since keywords associated with videos are determined on the basis of personal views of a person in charge of attaching meta-information, meta-information optimal for video content is not always attached. Thus, a user who extracts a video by searching based on meta-information may not be able to obtain a desired video if meta-information attached to the video is not appropriate even though the video essentially suits the desire of the user. That is, if meta-information unrelated to interest of the user who searches for a video is associated with the video, search accuracy does not improve and it is difficult for the user to obtain the desired video.

A similar problem also arises when associating meta-information with general multimedia data of, for example, still images and music, in addition to videos.

An embodiment of the present invention will be described below with reference to drawings. Though a video is taken below as an example for describing the embodiment, the present invention can be applied for general purpose use when, for example, meta-information is attached to multimedia data that is not represented by characters such as still images and music. Also, the description below assumes that, like a TV program, a video is broadcast to many users at a predetermined time.

Figure 1:
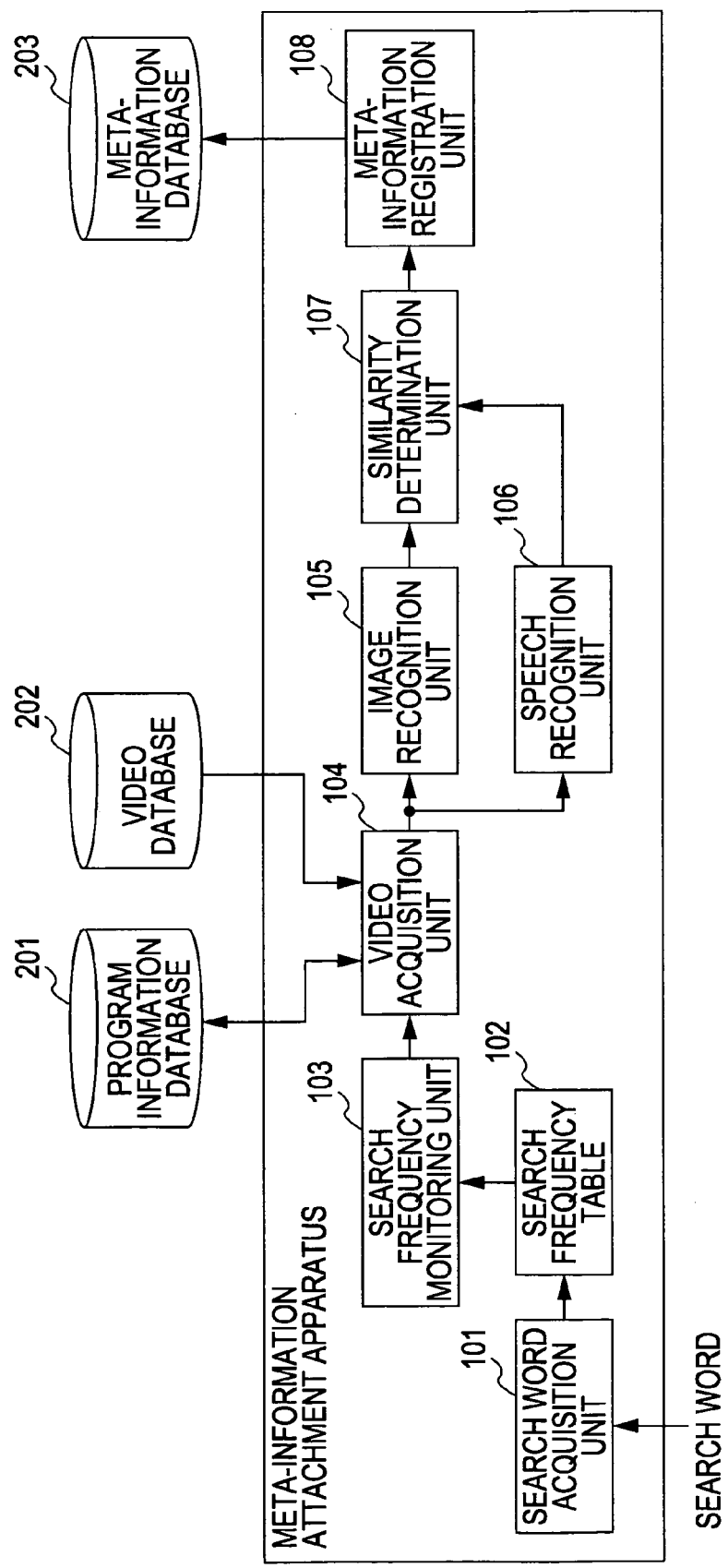
FIG. 1 is a block diagram showing principal components of a meta-information attachment apparatus according to an embodiment of the present invention.

FIG. 1 is a block diagram showing principal components of a meta-information attachment apparatus according to the embodiment of the present invention. The meta-information attachment apparatus shown in FIG. 1 comprises a search word acquisition unit 101, a search frequency table 102, a search frequency monitoring unit 103, a video acquisition unit 104, an image recognition unit 105, a speech recognition unit 106, a similarity determination unit 107, and a meta-information registration unit 108. The meta-information attachment apparatus is connected to a database such as a program information database 201, a video database 202, and a meta-information database 203 and can reference and update these databases.

The search word acquisition unit 101 acquires a search word to be searched at a search site (not shown) of the Internet or the like. The search word acquisition unit 101 immediately acquires a search word from a server (not shown) of a search site where a normal text search is done. Then, the search word acquisition unit 101 updates the search frequency of the acquired word in the search frequency table 102.

The search frequency table 102 stores the search frequency of each search word by being divided into two tables of a past table and a current table. More specifically, as shown, for example, in FIG. 2, the search frequency table 102 has the past table in which the average search frequency of each word during the period up until a month ago or more is stored and the current table in which the average search frequency of each word during the period of about a few hours to a day before present is stored. In FIG. 2, each table stores the search count of each word per hour and it is evident that, for example, the word "AAA" was searched 257 times per hour a month ago. Since the search count is not a count of searching by specific users, but of searching by the general public, the level of interest of the general public in each word is shown.

The search frequency monitoring unit 103 monitors the search frequency table 102 to detect words whose search frequency has increased rapidly and outputs such words to the video acquisition unit 104. More specifically, the search frequency monitoring unit 103 determines the search frequency of each word from the past table in the search frequency table 102 and also determines the current search frequency of each word from the current table. Then, the search frequency monitoring unit 103 determines whether the ratio of the current search frequency to the past search frequency is equal to or more than a predetermined threshold and outputs those words whose ratio is equal to or more than the predetermined threshold to the video acquisition unit 104.

One more specific example will be given with reference to FIG. 3. The search frequency monitoring unit 103 determines a past search frequency F1 by further averaging average search frequencies in predetermined periods of, for example, the word "AAA" from the past table and similarly determines a current search frequency F2 by further averaging average search frequencies in the current range of the word "AAA." Then, the search frequency monitoring unit 103 calculates a ratio F2/F1. If the ratio F2/F1 is equal to or more than a predetermined threshold, the search frequency of the word "AAA" is considered to have increased rapidly and is output to the video acquisition unit 104.

Figure 3:
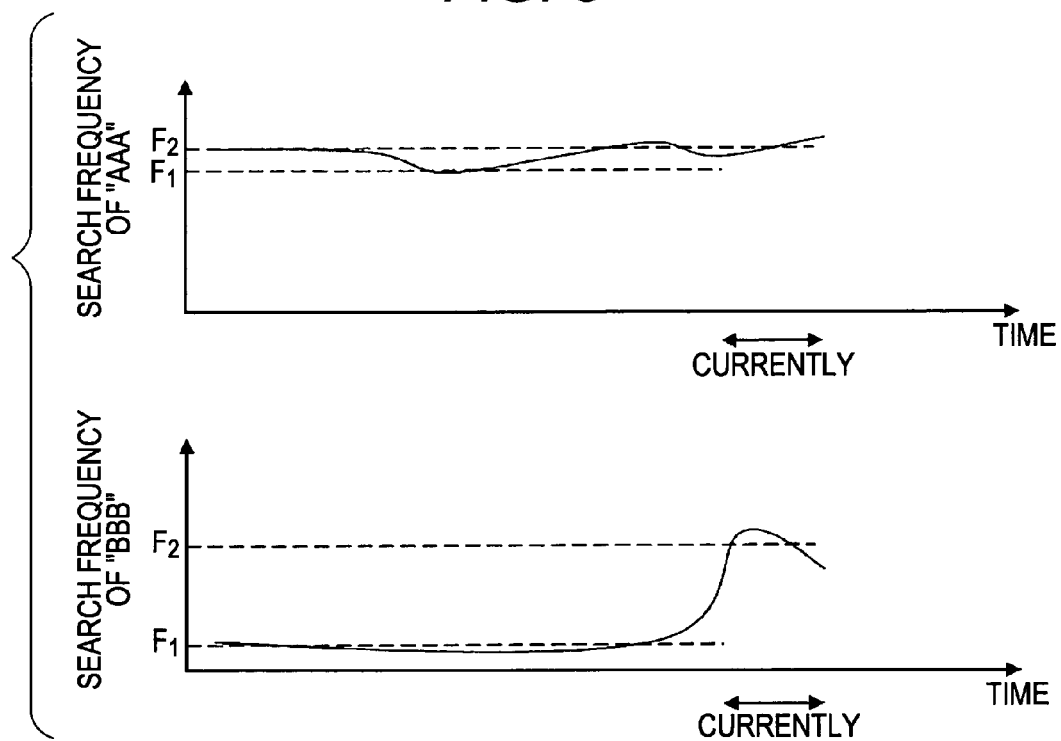
FIG. 3 is a diagram exemplifying changes in search frequency according to an embodiment of the present invention.

Therefore, the search frequency monitoring unit 103 determines that the search frequency has not increased rapidly for the word "AAA" if the ratio F2/F1 is small even if the search frequency is constantly high, as shown, for example, in the figure in upper FIG. 3. The search frequency-monitoring unit 103 also determines that the search frequency has increased rapidly for the word "BBB" if the ratio F2/F1 is large even if the past search frequency is low, as shown, for example, in the figure in lower FIG. 3. Search words whose search frequency has rapidly increased can be considered to reflect users' interest because it is highly probable that such search words are words in which the general public shows interest due to information from, for example, TV programs.

Using a word output from the search frequency monitoring unit 103, the video acquisition unit 104 identifies a video genre to be associated with meta-information and acquires videos of the identified genre from the video database 202. That is, the video acquisition unit 104 searches the program information database 201 for programs associated with the word output from the search frequency monitoring unit 103 and, as the result of searching, acquires videos of programs of the specific genre from the video database 202.

Here, the program information database 201 is, for example, a time table of TV programs and holds sketchy information (genres of, for example, news, dramas and so on) of programs comprising videos. The video database 202 holds actual videos whose program information is held by the program information database 201. Thus, if the genre of programs associated with a word output from the search frequency monitoring unit 103 is identifiable, the video acquisition unit 104 identifies the genre of programs and acquires only videos of the identified genre from the video database 202. If the genre of programs associated with a word output from the search frequency monitoring unit 103 is not identifiable, the video acquisition unit 104 acquires videos of all genres from the video database 202.

Figure 4:
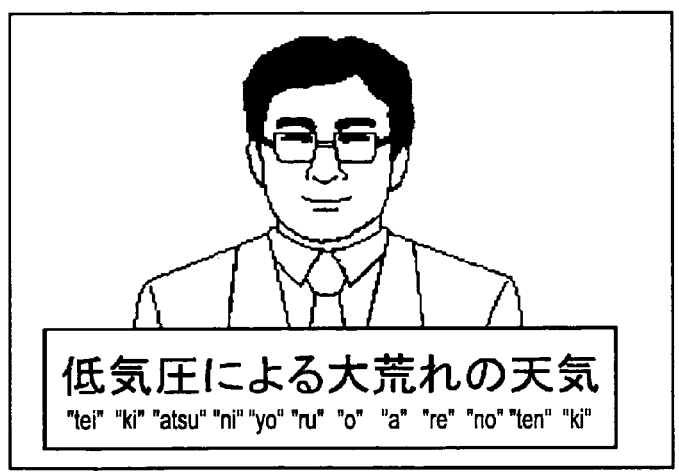
FIG. 4 is a diagram exemplifying a video that can be analyzed by the present invention.

The image recognition unit 105 performs image recognition of a video acquired by the video acquisition unit 104 and detects subtitles in the video to acquire character information from the subtitles. More specifically, the image recognition unit 105 performs edge detection using a Sobel filter or Laplacian filter of a framed image, for example, as shown in FIG. 4, constituting a video, and detects an area where edges are dense as subtitles including character information. Then, the image recognition unit 105 performs OCR (Optical Character Recognition) processing for the subtitle area to acquire all character information included in the subtitles. That is, in the framed image shown in FIG. 4, the image recognition unit 105 acquires all 12 characters of "低気圧による大荒れの天気(tei ki atsu ni yo ru o a re no ten ki)" in FIG. 9-A.

Then, the image recognition unit 105 creates a table as shown in FIG. 5 based on positions and certainty factor regarding information of each character in the framed image. That is, the start number and end number of a frame where information of each character is displayed, coordinates of character information in the framed image, character to be displayed, and certainty factor showing confidence in OCR processing are associated before storing them. The certainty factor is determined as a numerical value showing certainty of correctly recognizing characters using a pattern recognition method such as SVM (Support Vector Machine) when performing OCR processing. In FIG. 5, for example, the character "に(ni)" in FIG. 9-B is incorrectly recognized as the character ""に(ni)" in FIG. 9-C, resulting in a certainty factor of 0.65, which is lower than that of other characters.

The speech recognition unit 106 performs speech recognition of a video acquired by the video acquisition unit 104 and detects voice in the video to acquire spoken character information. More specifically, the speech recognition unit 106 detects a time zone in which voice is contained based on a sound volume or frequency distribution while playing back a video and performs speech recognition of voice in the time zone to acquire spoken character information. That is, in the framed image shown in FIG. 4, the speech recognition unit 106 acquires all 16 characters of "ていきあつによるおおあれのてんき (te i ki a tsu ni yo ru o o a re no te n ki)" in FIG. 9-D.

Then, the speech recognition unit 106 creates a table as shown in FIG. 6 based on a spoken time and certainty factor regarding information of each character. That is, the start time and end time when information of each character is spoken, spoken character, and certainty factor showing confidence in speech recognition are associated before storing them. For speech recognition, HMM (Hidden Markov Model) or the like is used for extracting character information.

The similarity determination unit 107 determines the degree of similarity between character information in the video acquired by the image recognition unit 105 and speech recognition unit 106 and the search word and determines whether any word similar to the search word is contained in the subtitles or speech in the video. Then, the similarity determination unit 107 determines whether a time difference between the time when a word similar to the search word is displayed and the time when the word is spoken is within a predetermined time.

More specifically, the similarity determination unit 107 searches the tables created by the image recognition unit 105 and speech recognition unit 106 for a character information group matching a character string of the search word and calculates an average value of the certainty factor corresponding to each piece of searched character information as the degree of similarity. Then, if the degree of similarity is equal to or more than a predetermined threshold, the similarity determination unit 107 determines that the searched character information group is similar to the search word.

Further, if the character information group similar to the search word is displayed and spoken within a predetermined time range, the search word is considered to be closely associated with video content, with both image recognition and speech recognition regarding the character information group being free of errors. Thus, the similarity determination unit 107 notifies the meta-information registration unit 108 that the search word is optimal as meta-information of the video together with the search word. If, on the other hand, the character information group similar to the search word is not displayed or spoken within the predetermined time range, the search word is considered to be associated with video content to a certain extent, though the character information group is either displayed or spoken in the video. Thus, the similarity determination unit 107 notifies the meta-information registration unit 108 that the search word is suitable as meta-information of the video together with the search word.

When notified from the similarity determination unit 107 of the search word and whether or not the search word is suitable as meta-information, the meta-information registration unit 108 registers the search word with the meta-information database 203 as meta-information of the video. At this point, if the meta-information registration unit 108 is notified that the search word is optimal as meta-information of the video, the meta-information registration unit 108 registers the search word with the meta-information database 203 as a primary keyword of the video. If the meta-information registration unit 108 is notified that the search word is suitable as meta-information of the video, the meta-information registration unit 108 registers the search word with the meta-information database 203 as a secondary keyword of the video.

Here, as shown, for example, in FIG. 7, the meta-information database 203 stores the program name of a video by associating it with the genre held in advance in the program information database 201, the main keyword registered in the meta-information registration unit 108, and the secondary keyword registered in the meta-information registration unit 108. Therefore, the meta-information registration unit 108 registers a search word optimal as meta-information of a video as a primary keyword and a search word suitable as meta-information of a video as a secondary keyword.

In FIG. 7, for example, the word "CYCLONE (tei ki atsu)" is displayed as a subtitle in the video of a program called "OO WEATHER FORECAST (ten ki yo hou)" and also spoken as a voice and therefore, the word is registered as a primary keyword. Similarly, for example, the word "CHILL (hi e ko mi)" is either displayed or spoken in the video of the program called "OO WEATHER FORECAST (ten ki yo hou)" and therefore, the word is registered as a secondary keyword.

Such a primary keyword and secondary keyword are both used as meta-information for managing videos. For example, when a user searches for a desired video, primary keywords and secondary keywords that match the word input by the user are searched from among those registered with the meta-information database 203 and videos corresponding to the keywords are reported to the user.

At this point, in the present embodiment, videos whose primary keywords include the word input by the user will be preferentially provided as a search result. That is, if the same word is searched for, videos having the word registered as a primary keyword are provided as a higher-level search result than those having the word registered as a secondary keyword. Incidentally, the present embodiment is described by assuming that priorities of keywords have only two levels of the primary keywords and secondary keywords. However, association of a search word and videos may be divided into more levels in accordance with a determination result of the degree of similarity by the similarity determination unit 107 to register such levels with the meta-information database 203.

Figure 8:
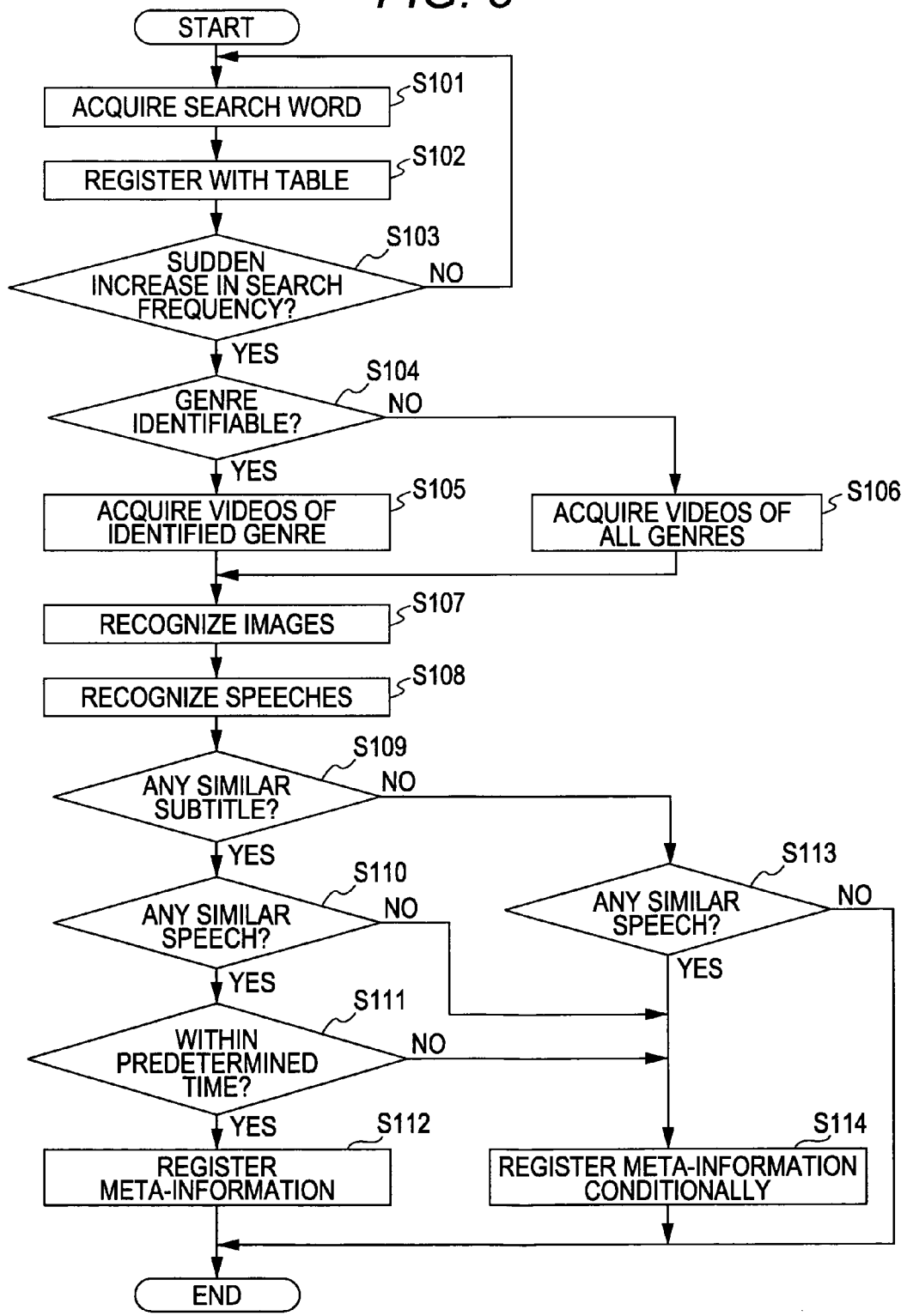
FIG. 8 is a flow chart showing an operation of meta-information attachment according to an embodiment of the present invention.

Next, the operation of the meta-information attachment apparatus configured as described above will be described with reference to the flow diagram shown in FIG. 8.

First, when a text search of a search word is done at a search site or the like on the Internet, the search word is searched for by a server (not shown) of the search site and also sent to a meta-information attachment apparatus. Then, the search word is acquired by the search word acquisition unit 101 of the meta-information attachment apparatus (step S101) and registered with the search frequency table 102 (step S102). More specifically, if the search word is already registered with the search frequency table 102, the average search frequency corresponding to the search word in the current table of the past table and current table is updated. If, on the other hand, the search word is not registered with the search frequency table 102, the search word is newly registered with the past table and current table, the average search frequency is set to 0 for the past table, and the average search frequency is determined from this one search to update the current table. In the current table exemplified in the figure in lower FIG. 2, the average search frequency of "0 to 4 hours ago" will be updated.

While the search frequency of each search word at the search site is updated as described above, the search frequency monitoring unit 103 determines whether or not the search frequency of each word registered with the search frequency table 102 has increased rapidly (step S103). That is, whether or not the search frequency in the current table compared with that in the past table of the search frequency table 102 has increased by a predetermined ratio or more is determined word by word. If, as a result, the search frequency has not increased rapidly (step S103 No), the search frequency table 102 will repeatedly be updated by search words acquired from the search site.

If, on the other hand, the search frequency has increased (step S103 Yes), the word is output to the video acquisition unit 104 and the video acquisition unit 104 determines whether or not the word is registered with the program information database 201 and the associated video genre is identifiable (step S104). Genres of programs comprising videos are stored in the program information database 201 and if the genre is identifiable from a portion of the search word (step S104 Yes), programs of the identified genre are referenced by the video acquisition unit 104 from the program information database 201 and actual videos are acquired from the video database 202 (step S105).

If, on the other hand, the genre is not identifiable (step S104 No), videos of all genres are acquired by the video acquisition unit 104 from the video database 202 (step S106). Incidentally, the video acquisition unit 104 acquires only those videos the elapsed time of which after being broadcast is within a predetermined time.

After a video is acquired by the video acquisition unit 104, the acquired video is output to the image recognition unit 105 and speech recognition unit 106. The image recognition unit 105 detects subtitles from framed images constituting the video and performs image recognition processing to acquire character information by OCR processing (step S107). Similarly, the speech recognition unit 106 detects voice from speeches in the video and performs speech recognition processing to acquire character information by speech recognition (step S108). With the image recognition processing and speech recognition processing, character information displayed as subtitles in the video and that spoken as a-voice will all have been acquired. As exemplified in FIG. 5 and FIG. 6, such character information is held by associating it with the display or speech time, certainty factor of recognition and the like.

The present embodiment is described by assuming that, each time a video is acquired by the video acquisition unit 104, image recognition and speech recognition are performed by the image recognition unit 105 and speech recognition unit 106 respectively. However, image recognition processing and speech recognition processing of a video may be performed in advance when the video is broadcast to store data exemplified in FIG. 5 and FIG. 6 for each video. The processing time required for image recognition processing and speech recognition processing can thereby be reduced.

If character information in the video is acquired, the similarity determination unit 107 performs matching of the search word and the displayed or spoken character information. That is, the similarity determination unit 107 first detects a character information group matching a character string of the search word from subtitles in the video. At this point, matching of the character string of the search word and the character information group of subtitles is not limited to exact matching and partial matching may also be allowed. Then, based on the certainty factor of the character information group matching the character string of the search word, the degree of similarity between the search word and the character information group is calculated, and whether or not any similar subtitle whose degree of similarity to the search word is equal to or more than a predetermined threshold is contained in the video is determined (step S109)

If, as a result, a similar subtitle is contained in the video (step 109 Yes), the similarity determination unit 107 detects a character information group matching the character string of the search word from speeches in the video. At this point, matching of the character string of the search word and the character information group of speech is not limited to exact matching and partial matching may also be allowed. Then, based on the certainty factor of the character information group matching the character string of the search word, the degree of similarity between the search word and the character information group is calculated, and whether or not any similar speech whose degree of similarity to the search word is equal to or more than a predetermined threshold is contained in the video is determined (step S110). As the degree of similarity when determining a similar subtitle or a similar speech, for example, an average value of certainty factors of character information groups matching the search word may be used.

Then, if both a similar subtitle and a similar speech of the search word are contained in the video (step S110 Yes), the similarity determination unit 107 determines whether or not the similar subtitle and the similar speech are displayed and spoken respectively within a predetermined time (step S111). If, as a result, the similar subtitle and the similar speech occur within a predetermined time (step S111 Yes), the search word is determined to be optimal as meta-information, of video, of which the similarity determination unit 107 notifies the meta-information registration unit 108. That is, if a similar subtitle and a similar speech matching a search word occur within a time close to each other, the probability that both image recognition and speech recognition are correct is high and the search word is considered to be closely associated with video content and there fore, the search word is determined to be optimal as meta-information of the video.

If notified that the search word is optimal as meta-information of the video, the meta-information registration unit 108 registers the search word with the meta-information database 203 as a primary keyword of the video (step S112). Therefore, among search words users are widely interested in and whose search frequency has increased rapidly, those search words contained in a video as a subtitle and a speech will be registered with the meta-information database 203 as primary keywords of the video. Though transmission by various media can be considered to be a trigger of search frequency rapidly increased, the search frequency of search words many users are interested in increases rapidly in any event. Therefore, even if broadcasting of a video to which meta-information is to be attached has not directly triggered off a rapid increase in search frequency, a search word reflecting users' interest will in any case be attached to the video.

If, on the other hand, the similar subtitle and the similar speech occur shifted beyond a predetermined time from each other (step S111 No), the search word is determined to be suitable under certain conditions as meta-information of the video, of which the similarity determination unit 107 notifies the meta-information registration unit 108. That is, if the similar subtitle and the similar speech matching the search word occur at mutually different times, either image recognition or speech recognition may be incorrect. Therefore, it is determined that only one of the similar subtitle and the similar speech with a higher degree of similarity to the search word occurs and the search word is suitable as meta-information of the video to a certain extent.

If notified that the search word is suitable as meta-information of the video, the meta-information registration unit 108 registers the search word with the meta-information database 203 as a secondary keyword of the video (step S114). Though the search word is registered as a secondary keyword here, if a similar subtitle and a similar speech do not occur within a predetermined time, it is sufficient that the search word is registered with the meta-information database 203 under certain conditions in accordance with the degree of similarity between the search word and the similar subtitle or similar speech.

Up to now, cases in which the similarity determination unit 107 determines that both a subtitle and a speech similar to the search word exist have been described. However, if it is determined that no similar subtitle is contained in the video (step S109 No), like when a similar subtitle has been found, the similarity determination unit 107 detects a character information group matching the character string of the search word from speeches in the video. At this point, matching of the character string of the search word and the character information group of speech is not limited to exact matching and partial matching may also be allowed. Then, based on the certainty factor of the character information group matching the character string of the search word, the degree of similarity between the search word and the character information group is calculated. and whether or not any similar speech whose degree of similarity to the search word is equal to or more than a predetermined threshold is contained in the video is determined (step S113).

If, as a result, no similar speech of the search word is contained in the video (step S113 No), neither similar subtitle nor similar speech of the search word will be contained in the video. Therefore, the search word is determined not to be associated with the video and will not be registered as meta-information of the video.

If a similar speech of the search word is contained in the video even though no similar subtitle is contained therein (step S113 Yes) or a similar-subtitle of the search word is contained in the video even though no similar speech is contained therein (step S110 Yes), the search word is contained in one of the subtitle and speech. Thus, the similarity determination unit 107 determines that the search word is suitable as meta-information of the video under certain conditions, of which the meta-information registration unit 108 is notified. That is, if one of a similar subtitle and a similar speech matching a search word occurs, the search word is determined to be suitable as meta-information of a video to a certain extent.

If notified that the search word is suitable as meta-information of the video, the meta-information registration unit 108 registers the search word with the meta-information database 203 as a secondary keyword of the video (step S114). Though the search word is registered as a secondary keyword here, if one of the similar subtitle and similar speech occurs, it is sufficient that the search word is registered with the meta-information database 203 under certain conditions in accordance with the degree of similarity between the search word and the similar subtitle or similar speech.

In the present embodiment, as has been described above, a search word whose search frequency has increased rapidly at a search site is detected, matching of the search word and subtitles and speeches in the video is performed and, if the search word is contained as a subtitle or speech, the search word is registered as meta-information of the video. Thus, search words whose search frequency is considered to have increased due to users' growing interest can be attached as meta-information of the video so that meta-information reflecting users' interest can automatically be attached to multimedia data.

Incidentally, in the above embodiment, in order to detect that the search frequency has rapidly increased, whether the ratio of the search frequency of the current table in the search frequency table 102 to that of the past table is equal to or more than a predetermined threshold ratio is determined. However, if it is evident that the search frequency has rapidly increased, changes in search frequency may be detected using any other measure than this ratio. That is, for example, search words whose current search count has increased by comparing an absolute value of the past search count and that of the current search count may be extracted or search words whose current search count is much higher than the current average search count of all words may be extracted.

Moreover, in the above embodiment, a case in which meta-information is attached to a video by a meta-information attachment apparatus has been described, but it is also possible to create a program corresponding to the above processing to be execute by a computer.

According to the present invention, a search word whose search frequency is considered to have increased due to users growing interest can be attached as meta-information of multimedia data containing the search word as character information so that meta-information reflecting users interest can automatically be attached to multimedia data.

Also, a search word in which current interest has increased compared with the past can reliably be detected so that meta-information a user can easily search for can be attached to multimedia data.

Also, multimedia data to be compared with a search word can be retrieved from among a vast amount of multimedia data, reducing processing load.

Also, character recognition processing is performed each time a search word whose search frequency satisfies a predetermined criterion is detected and therefore, there is no need to store character information in a video.

Also, among search words whose search frequency satisfies a predetermined criterion, those associated with video data content can reliably be extracted to make them meta-information.

Also, a matching character recognition result is correct and search words closely associated with video data content can be selected to make them meta-information.

Also, search words considered to be associated with video data content to a certain extent can be registered as low-priority meta-information so that priorities can be assigned to search results when video data is searched using meta-information.

Also, priorities can be assigned to search results when video data is searched using meta-information.

What is claimed is:

1. A computer readable recording medium storing an information attachment program for attaching meta-information for management to multimedia data executed by a computer, the program comprising:
monitoring whether or not a search frequency, in predetermined periods, of a search word satisfies a predetermined criterion, wherein the predetermined criterion is satisfied if a ratio of a current search frequency of the search word to a past search frequency of the search word is equal to or more than a predetermined ratio;
determining whether or not at least a portion of the search word matches a character recognition processing result of the multimedia data when the search frequency of the search word is determined to satisfy the predetermined criterion; and
registering the search word as meta-information of the multimedia data when at least the portion of the search word matches the character recognition processing result;
wherein the search word is registered, when the search word is registered as meta-information of the multimedia data, by assigning priorities in accordance with a certainty factor of the character recognition processing result matching the search word,
wherein the past search frequency is obtained from first average search frequencies of each search word during a first time period prior to a predetermined time, and the current search frequency is obtained from second average search frequencies of each search word during a second period within a specified time length from a time of acquisition of the search word, the second period being shorter than the first period.

2. The computer readable recording medium according to claim 1, wherein the determining includes acquiring multimedia data of an identified genre after identifying the genre of the multimedia data associated with the search word, wherein a character recognition processing result of the acquired multimedia data and the search word are compared for determination.

3. The computer readable recording medium according to claim 1, wherein the determining includes performing character recognition processing of the multimedia data, wherein a character recognition processing result and the search word are compared for determination.

4. The computer readable recording medium according to claim 1, wherein the determining compares both a character recognition result acquired from images of video data and that acquired from speeches of the video data with the search word for determination.

5. The computer readable recording medium according to claim 4, wherein the registering the search word as meta-information registers the search word as meta-information of the video data if both the character recognition result acquired from images and that acquired from speeches match the search word and both character recognition results matching the search word are within a predetermined time.

6. The computer readable recording medium according to claim 4, wherein the registering the search word as meta-information registers the search word as secondary meta-information of the video data if one of the character recognition result acquired from images and that acquired from speeches matches the search word.

7. An information attachment apparatus having a computer for attaching meta-information for management to multimedia data, the apparatus comprising:
a monitoring unit monitoring whether or not a search frequency, in predetermined periods, of a search word satisfies a predetermined criterion, wherein the predetermined criterion is satisfied if a ratio of a current search frequency of the search word to a past search frequency of the search word is equal to or more than a predetermined ratio;
a determination unit determining whether or not at least a portion of the search word matches a character recognition processing result of the multimedia data when the search frequency of the search word is determined to satisfy the predetermined criterion by the monitoring unit; and
a registration unit registering the search word as meta-information of the multimedia data when at least the portion of the search word matches the character recognition processing result;
wherein the registration unit registers the search word, when the search word is registered as meta-information of the multimedia data, by assigning priorities in accordance with a certainty factor of the character recognition processing result matching the search word,
wherein the past search frequency is obtained from first average search frequencies of each search word during a first time period prior to a predetermined time, and the current search frequency is obtained from second average search frequencies of each search word during a second period within a specified time length of the from a time of acquisition of the search word, the second period being shorter than the first period.

8. The information attachment apparatus according to claim 7, wherein the determination unit includes a multimedia data acquisition unit for acquiring multimedia data of an identified genre after identifying the genre of the multimedia data associated with the search word, wherein
a character recognition processing result of the multimedia data acquired by the multimedia data acquisition unit and the search word are compared for determination.

9. The information attachment apparatus according to claim 7, wherein the determination unit includes a recognition processing unit performing character recognition processing of the multimedia data, wherein
a character recognition processing result acquired by the recognition processing unit and the search word are compared for determination.

10. The information attachment apparatus according to claim 7, wherein the determination unit compares both a character recognition result acquired from images of video data and that acquired from speeches of the video data with the search word for determination.

11. An information attachment method of attaching meta-information for management to multimedia data, the method comprising:
monitoring whether or not a search frequency, in predetermined periods, of a search word satisfies a predetermined criterion, wherein the predetermined criterion is satisfied if a ratio of a current search frequency of the search word to a past search frequency of the search word is equal to or more than a predetermined ratio;
determining whether or not at least a portion of the search word matches a character recognition processing result of the multimedia data when the search frequency of the search word is determined to satisfy the predetermined criterion; and
registering the search word as meta-information of the multimedia data when at least the portion of the search word matches the character recognition processing result;
wherein the search word is registered, when the search word is registered a meta-information of the multimedia data, by assigning priorities in accordance with a certainty factor of the character recognition processing result matching the search word,
wherein the past search frequency is obtained from first average search frequencies of each search word during a first time period prior to a predetermined time, and the current search frequency is obtained from second average search frequencies of each search word during a second period within a specified time length of the from a time of acquisition of the search word, the second period being shorter than the first period.

12. The information attachment method according to claim 11, wherein the determining includes a acquiring multimedia data of an identified genre after identifying the genre of the multimedia data associated with the search word, wherein
a character recognition processing result of the acquired multimedia data and the search word are compared for determination.

13. The information attachment method according to claim 11, wherein the determining includes performing character recognition processing of the multimedia data, wherein
a character recognition processing result and the search word are compared for determination.

14. The information attachment method according to claim 11, wherein the determining compares both a character recognition result acquired from images of video data and that acquired from speeches of the video data with the search word for determination.

* * * * *